(12) United States Patent
Malek

(10) Patent No.: US 12,120,796 B2
(45) Date of Patent: Oct. 15, 2024

(54) LIGHTING PROGRAM FOR AIRCRAFT INTERIOR

(71) Applicant: BOMBARDIER INC., Dorval (CA)

(72) Inventor: Bruce Malek, Senneville (CA)

(73) Assignee: BOMBARDIER INC., Dorval (CA)

(*) Notice: Subject to any disclaimer, the term of this patent is extended or adjusted under 35 U.S.C. 154(b) by 146 days.

(21) Appl. No.: 17/990,004

(22) Filed: Nov. 18, 2022

(65) Prior Publication Data

US 2023/0217573 A1 Jul. 6, 2023

Related U.S. Application Data

(60) Provisional application No. 63/281,607, filed on Nov. 19, 2021.

(51) Int. Cl.
| | |
|---|---|
| *H05B 47/16* | (2020.01) |
| *B60Q 3/47* | (2017.01) |
| *B60Q 3/74* | (2017.01) |
| *B64D 11/00* | (2006.01) |

(52) U.S. Cl.
CPC ............. *H05B 47/16* (2020.01); *B60Q 3/47* (2017.02); *B60Q 3/74* (2017.02); *B64D 11/00* (2013.01); *B64D 2011/0038* (2013.01)

(58) Field of Classification Search
None
See application file for complete search history.

(56) References Cited

U.S. PATENT DOCUMENTS

| | | | |
|---|---|---|---|
| 9,884,683 B2 | 2/2018 | Fehringer | |
| 2006/0208169 A1* | 9/2006 | Breed | G01S 17/88 |
| | | | 250/221 |
| 2014/0309789 A1* | 10/2014 | Ricci | G06Q 20/308 |
| | | | 700/276 |
| 2020/0283151 A1* | 9/2020 | Key | B64D 13/08 |

FOREIGN PATENT DOCUMENTS

| | | |
|---|---|---|
| GB | 2506380 A | 4/2014 |
| WO | 2016145059 A1 | 9/2016 |
| WO | 2021228742 A1 | 11/2021 |

OTHER PUBLICATIONS

European Search Report with regard to EP22208446.9 completed Apr. 4, 2023.

* cited by examiner

*Primary Examiner* — Wilson Lee
(74) *Attorney, Agent, or Firm* — BCF LLP

(57) ABSTRACT

A method for controlling lighting in an interior of an aircraft, a lighting control system, and computer program product. The method includes: determining a departure time adjusted for an offset from GMT at a departure location and an arrival time adjusted for an offset from GMT at an arrival location as epoch times; generating a flight time with GMT offsets based on subtracting the departure time from the arrival time; determining an FMS flight time representing the expected time that the aircraft will be in flight between the departure location and the arrival location; generating a simulation ratio modifier based on dividing the FMS flight time by the flight time with GMT offsets; applying the simulation ratio modifier to periods of a day to generate scaled durations for periods of the day in a lighting program; and applying the program to control the cabin lighting on the aircraft.

9 Claims, 18 Drawing Sheets

Midnight (Start of Day)
- Type = Fix
- Programmed Time = 00:00:00
- Start Time = 00:00:00 = 0
- Run Time = Sunrise/Start Time - Midnight/Start Time = 21600 - 0 = (REF) 21600
- Pre-set = P0001

Sunrise
- Type = Programmed = Preset - Dynamic Show
- Programmed Time = 00:15:00 = 900
- Time Start = Day Sunrise = (REF) 6:00:00 = (REF) 21600
- Run Time = Sunrise/Programmed Time = 900
- Pre-set = D0001

Dawn (Break of Day)
- Type = Calculated
- Programmed Time = 00:00:00
- Time Start = Sunrise/Programmed Time = Sunrise/Start Time = (REF) 21600 + 900 = (REF) 22500
- Run Time = (Noon/Start Time - Dawn/Start Time) / 3 = (43200 - (REF) 22500)) / 3 = (REF) 6900
- Pre-set = P0002

Morning
- Type = Calculated
- Programmed Time = 00:00:00
- Time Start = Dawn/Time Start + Dawn/Runtime = (REF) 22500 + (REF) 6900 = (REF) 29400
- Run Time = (Noon/Start Time - Dawn/Start Time) / 3 = (43200 - (REF) 22500)) / 3 = (REF) 6900
- Pre-set = P0003

Mid Morning
- Type = Calculated
- Programmed Time = 00:00:00
- Time Start = Morning/Time Start + Morning/Runtime = (REF) 27675 + (REF) 6900 = (REF) 36300
- Run Time = (Noon/Start Time - Dawn/Start Time) / 3 = (43200 - (REF) 22500)) / 3 = (REF) 6900
- Pre-set = P0004

Noon
- Type = Fix
- Programmed Time = 00:00:00 = 0
- Time Start = 12:00:00 * 86400 = 43200
- Run Time = Sunrise/Start Time - Midnight/Start Time = ((REF 69300 - 43200) / 5 = (REF) 5220
- Pre-set = P0001

To FIG. 11B

From FIG. 11A

Basic Day Calculation

Afternoon
- Type = Calculated
- Programmed Time = 00:00:00
- Time Start = Noon/Start Time + Noon/RunTime = 43200 + (REF) 5040 = ⊙ (REF) 48420
- Run Time = (Sunset/Start Time - Noon/Start Time) / 5 = ((REF) 69300 - 43200) / 5 = ⊙ (REF) 5220
- Pre-set = P0006

Late Afternoon
- Programmed Time = 00:00:00
- Time Start = Afternoon/Start Time + Afternoon/RunTime = ⊙ (REF) 48420 + (REF) 5220 = ⊙ (REF) 53640
- Run Time = (Sunset/Start Time - Noon/Start Time) / 5 = ((REF) 69300 - 43200) / 5 = ⊙ (REF) 5220
- Pre-set = P0007

Evening
- Programmed Time = 00:00:00
- Time Start = Afternoon/Start Time + Afternoon/RunTime = ⊙ (REF) 48420 + (REF) 5220 = ⊙ (REF) 53640
- Run Time = (Sunset/Start Time - Noon/Start Time) / 5 = ((REF) 69300 - 43200) / 5 = ⊙ (REF) 5220
- Pre-set = P0008

Dusk
- Programmed Time = 00:00:00
- Time Start = Evening/Start Time + Evening/RunTime = ⊙ (REF) 58860 + (REF) 5220 = ⊙ (REF) 64080
- Run Time = (Sunset/Start Time - Noon/Start Time) / 5 = ((REF) 69300 - 43200) / 5 = ⊙ (REF) 5220
- Pre-set = P0009
- Type = Programmed = Preset - Dynamic Show
- Programmed Time = 00:15:00 = 900

Sunset
- Time Start = (Day Sunset * 86400) - Sunset/Programmed Time = ((REF) 19:30:00 * 86400) - 900 = ⊙ (REF) 69300
- Run Time = Sunset/Programmed Time = 900
- Pre-set = D0002

Night Start
- Programmed Time = 00:00:00
- Time Start = Sunset/Start Time + Sunset/Programmed Time = ⊙ (REF) 70200 + 900 = ⊙ (REF) 71100
- Run Time = (Night/Start Time - Sunset/Start Time) = 86400 - (REF) 71100 = ⊙ (REF) 15300
- Pre-set = P0008

Night (End of Day)
- Type = Fix
- Start Time = 24:00:00 = 86400
- Programmed Time = 00:00:00 = 0
- Run Time = Night/Programmed Time = 0
- Pre-set = P0001
  - ⊙ (REF) 5220

Rules
- Day 2 = Time Stamp + 86400
- Day 3 = Time Stamp + (86400*2)

Breakfast
- Type ○ Programmed
- Start Time ○ 07:00:00 ○ 07:00:00 * 86400 = ○ 25200
- Programmed Time ○ 00:20:00 ○ 00:20:00 * 86400 = ○ 1200
- RunTime ○ Breakfast/Programmed Time = ○ 1200
- Pre-Set ○ M0002

Lunch
- Type ○ Programmed
- Start Time ○ 12:30:00 ○ 12:30:00 * 86400 = ○ 45000
- Programmed Time ○ 00:30:00 ○ 00:30:00 * 86400 = ○ 1800
- RunTime ○ Lunch/Programmed Time = ○ 1800
- Pre-Set ○ M0002

Dinner
- Type ○ Programmed
- Start Time ○ 18:45:00 ○ 18:45:00 * 86400 = ○ 67500
- Programmed Time ○ 00:40:00 ○ 00:40:00 * 86400 = ○ 2400
- RunTime ○ Dinner/Programmed Time = ○ 2400
- Pre-Set ○ M0003

Breakfast Day 2
- Type ○ Programmed
- Start Time ○ 07:00:00 + Day 2 ○ (07:00:00 * 86400) + 86400 = ○ 111600
- Programmed Time ○ 00:20:00 ○ 00:20:00 * 86400 = ○ 1200
- RunTime ○ Breakfast/Programmed Time = ○ 1200
- Pre-Set ○ M0001

Lunch Day 2
- Type ○ Programmed
- Start Time ○ 12:30:00 + Day 2 ○ (12:30:00 * 86400) + 86400 = ○ 131400
- Programmed Time ○ 00:30:00 ○ 00:30:00 * 86400 = ○ 1800
- RunTime ○ Lunch Day 2/Programmed Time = ○ 1800
- Pre-Set ○ M0002

Dinner Day 2
- Type ○ Programmed
- Start Time ○ 18:45:00 + Day 2 ○ (18:45:00 * 86400) + 86400 = ○ 131400
- Programmed Time ○ 00:40:00 ○ 00:40:00 * 86400 = ○ 1800
- RunTime ○ Dinner Day 2/Programmed Time = ○ 1800
- Pre-Set ○ M0003

From FIG. 12A

Flight Plan Calculator

Departure Time
- Type ⊙ Fix
- Start Time ⊙ DepartureTime/Start Time + Departure Time/Run Time = ⊙ 68400
- Programmed Time ⊙ 00:00:00 ⊙ 0
- RunTime ⊙ Departure /Programmed Time = ⊙ 0
- Pre-Set ⊙ F0001

Departure Boarding
- Type ⊙ Programmed
- Start Time ⊙ DepartureTime/Start Time + Departure Time/Run Time = ⊙ 68400
- Programmed Time ⊙ 600
- RunTime ⊙ Departure Boarding/Programmed Time = ⊙ 600
- Pre-Set ⊙ F0001

Departure TTL
- Type ⊙ Programmed
- Start Time ⊙ Departure Boarding/Start Time + Departure Boarding/Run Time = ⊙ 68400 + 600 = ⊙ 69000
- Programmed Time ⊙ 600
- RunTime ⊙ Departure TTL/Programmed Time = ⊙ 600
- Pre-Set ⊙ F0002

Arrival TTL
- Type ⊙ Programmed
- Start Time ⊙ Arrival Disembark/Start Time + Arrival Disembark/Run Time = 120000-600 = ⊙ 124800
- Programmed Time ⊙ 600
- RunTime ⊙ Arrival TTL/Programmed Time = ⊙ 600
- Pre-Set ⊙ F0003

Arrival Disembark
- Type ⊙ Programmed
- Start Time ⊙ Arrival Time/Start Time - Arrival Time/Run Time= ⊙ 125400
- Programmed Time ⊙ 600
- RunTime ⊙ Arrival Boarding/Programmed Time = ⊙ 600
- Pre-Set ⊙ F0004

Arrival Time
- Type ⊙ Fix
- Start Time ⊙ 126000 (REF) = Oct 26, 2021, 11:00:00 GMT
- Programmed Time ⊙ 00:00:00 ⊙ 0
- RunTime ⊙ Arrival/Programmed Time = ⊙ 0
- Pre-Set ⊙ F0004

DSL Off
- Type ⊙ Fix
- Start Time ⊙ Arrival Time/Start Time = ⊙ 126000
- Programmed Time ⊙ 1
- RunTime ⊙ DSL OFF/Programmed Time = ⊙ 1
- Pre-Set ⊙ A0001

FIG. 12B

Rules: Arrival Date = Departure Date + 1 Day = Amount of day that need to be created in the Flight Schedular
Start Time = Time Stamp Flight Plan Schedular Standard Day

Day 1 Calculator

|  | Per-Set | Time Stamp | (REF) Time | Duration |
|---|---|---|---|---|
| Midnight (Start of Day) | P0001 | 0 | 00:00:00 | 20700 |
| Sunrise | D0001 | 20700 | 5:45:00 | 900 |
| Dawn (Break of Day) | P0002 | 21600 | 6:00:00 | 7200 |
| Morning | P0003 | 28800 | 8:00:00 | 7200 |
| Mid Morning | P0004 | 36000 | 10:00:00 | 7200 |
| Noon | P0005 | 43200 | 12:00:00 | 5400 |
| Afternoon | P0006 | 48600 | 13:30:00 | 5400 |
| Late Afternoon | P0007 | 54000 | 15:00:00 | 5400 |
| Evening | P0008 | 59400 | 16:30:00 | 5400 |
| Dusk | P0009 | 64800 | 18:00:00 | 5400 |
| Sunset | D0002 | 70200 | 19:30:00 | 900 |
| Night Start | P0001 | 71100 | 19:45:00 | 15300 |
| Night (End of Day) | P0001 | 86400 | 24:00:00 | 10 |

522

Day 2 Calculator

|  | Per-Set | Time Stamp | (REF) Time | Duration |
|---|---|---|---|---|
| Midnight (Start of Day) | P0001 | 86400 | 24:00:00 | 21600 |
| Sunrise | D0001 | 108000 | 30:00:00 | 900 |
| Dawn (Break of Day) | P0002 | 108900 | 30:15:00 | 6900 |
| Morning | P0003 | 115800 | 32:10:00 | 6900 |
| Mid Morning | P0004 | 122700 | 34:05:00 | 6900 |
| Noon | P0005 | 129600 | 36:00:00 | 5784 |
| Afternoon | P0006 | 135348 | 37:35:48 | 5784 |
| Late Afternoon | P0007 | 141096 | 39:11:36 | 5784 |
| Evening | P0008 | 146844 | 40:47:24 | 5784 |
| Dusk | P0009 | 152592 | 42:32:12 | 5784 |
| Sunset | D0002 | 158340 | 43:59:00 | 900 |
| Night Start | P0001 | 159240 | 44:14:00 | 13560 |
| Night (End of Day) | P0001 | 172800 | 48:00:00 | 0 |

Rules:
- Apply Simulation Ratio Modifier to all Time Stamp < Departure Time — Time Stamp ⊙ 68400, Simulation Ratio Modifier
- Apply Simulation Ratio Modifier to all Time Stamp < DLS Stop — Time Stamp ⊙ 12600, Simulation Ratio Modifier Flight Plan Schedular Simulated Standard Day

Day 1 Calculator

|  | Per-Set | Time Stamp | (REF) Time | Duration | SRM | Label 6 |
|---|---|---|---|---|---|---|
| Midnight (Start of Day) | P0001 | 0 | 00:00:00 | 20700 | 0 | 20700 |
| Sunrise | D0001 | 20700 | 5:45:00 | 900 | 0 | 900 |
| Dawn (Break of Day) | P0002 | 21600 | 6:00:00 | 7200 | 0 | 7200 |
| Morning | P0003 | 28800 | 8:00:00 | 7200 | 0 | 7200 |
| Mid Morning | P0004 | 36000 | 10:00:00 | 7200 | 0 | 7200 |
| Noon | P0005 | 43200 | 12:00:00 | 5400 | 0 | 5400 |
| Afternoon | P0006 | 48600 | 13:30:00 | 5400 | 0 | 5400 |
| Late Afternoon | P0007 | 54000 | 15:00:00 | 5400 | 0 | 5400 |
| Evening | P0008 | 59400 | 16:30:00 | 5400 | 0 | 5400 |
| Dusk | P0009 | 64800 | 18:00:00 | 5400 | 0.5 | 2700 |
| Sunset | D0002 | 70200 | 19:30:00 | 900 | 0.5 | 45 |
| Night Start | P0001 | 71100 | 19:45:00 | 15300 | 0.5 | 7650 |
| Night (End of Day) | P0001 | 86400 | 24:00:00 | 0 | 0.5 | 0 |

Day 2 Calculator

|  | Per-Set | Time Stamp | (REF) Time | Duration | SRM | Label 6 |
|---|---|---|---|---|---|---|
| Midnight (Start of Day) | P0001 | 86400 | 24:00:00 | 21600 | 0.5 | 10800 |
| Sunrise | D0001 | 108000 | 30:00:00 | 900 | 0.5 | 450 |
| Dawn (Break of Day) | P0002 | 108900 | 30:15:00 | 6900 | 0.5 | 3450 |
| Morning | P0003 | 115800 | 32:10:00 | 6900 | 0.5 | 3450 |
| Mid Morning | P0004 | 122700 | 34:05:00 | 6900 | 0.5 | 3450 |
| Noon | P0005 | 129600 | 36:00:00 | 5784 | 0.5 | 2937 |
| Afternoon | P0006 | 135348 | 37:35:48 | 5784 | 0 | 5784 |
| Late Afternoon | P0007 | 141096 | 39:11:36 | 5784 | 0 | 5784 |
| Evening | P0008 | 146844 | 40:47:24 | 5784 | 0 | 5784 |
| Dusk | P0009 | 152592 | 42:32:12 | 5784 | 0 | 5784 |
| Sunset | D0002 | 158340 | 43:59:00 | 900 | 0 | 900 |
| Night Start | P0001 | 159240 | 44:14:00 | 13560 | 0.5 | 13560 |
| Night (End of Day) | P0001 | 172800 | 48:00:00 | 0 | 0 | 0 |

FIG. 15

LIGHTING PROGRAM FOR AIRCRAFT INTERIOR

CROSS-REFERENCE

The present application claims priority to U.S. Provisional Patent Application No. 63/281,607, entitled "Lighting Program for Aircraft Interior", filed on Nov. 19, 2021, the entirety of which is incorporated by reference herein.

FIELD OF TECHNOLOGY

The present technology relates to a method for producing a lighting program for interior lighting in an aircraft.

BACKGROUND

Long flights can lead to jetlag for the passengers. A lighting program that adjusts the cabin lighting during flight can be used to diminish the effects of jetlag by affecting the circadian rhythm of the passengers. Known lighting program systems have difficulty adjusting the cabin lighting conditions when departing or arriving at polar regions, where sunrise and sunset times may be inapplicable. For example, previously known systems may simply use arbitrary sunrise or sunset times in such circumstances, such as 07:00 for the sunrise time and 19:00 for the sunset time. Using such arbitrary times fails to properly adjust the interior lighting and may reduce the efficacy of lighting programs in diminishing jetlag.

SUMMARY

Various implementations of the disclosed technology provide for scheduling of lighting events in the interior of an aircraft according to simulation logic that processes scheduled times in an "epoch time" format, which simplifies calculations involving times and durations. If there is no sunrise or sunset time, the duration of an offset between a start of day/sunrise and sunset/end of day is set to 0, instead of assigning arbitrary times for a sunrise and sunset. This enables the system to better respect the actual lighting conditions at sunrise and sunset in polar regions.

In a first aspect, the technology is implemented as a method for use on a lighting control system that is communicatively coupled to cabin lighting on an aircraft to control lighting in an interior of the aircraft according to a lighting program. The method includes: determining a departure time and an arrival time as epoch times, the departure time being adjusted for an offset from GMT at a departure location and the arrival time being adjusted for an offset from GMT at an arrival location; generating a flight time with GMT offsets based, at least in part, on subtracting the departure time from the arrival time; determining an FMS flight time that represents the expected time that the aircraft will be in flight between the departure location and the arrival location; generating a simulation ratio modifier based, at least in part, on dividing the FMS flight time by the flight time with GMT offsets; applying the simulation ratio modifier to periods of a day between departure and arrival to generate scaled durations for periods of the day in a lighting program; and applying the lighting program to control the cabin lighting on the aircraft during flight according to the scaled durations.

In some implementations, the periods of the day between departure and arrival include a sunrise and/or a sunset. In some implementations, if there is no sunrise time and/or no sunset time, the duration of an offset between a start of day/sunrise and a sunset/end of day is set to zero.

BRIEF DESCRIPTION OF THE DRAWINGS

These and other features, aspects and advantages of the present technology will become better understood with regard to the following description, appended claims and accompanying drawings where:

FIGS. 11A and 11B show basic calculations of the daylight simulation logic;

FIGS. 12A and 12B show flight plan calculations of the daylight simulation logic;

FIG. 14 shows a flight schedular standard day table of the daylight simulation logic;

FIG. 15 shows a flight schedular simulated standard day table of the daylight simulation logic.

DETAILED DESCRIPTION

Figure 1:
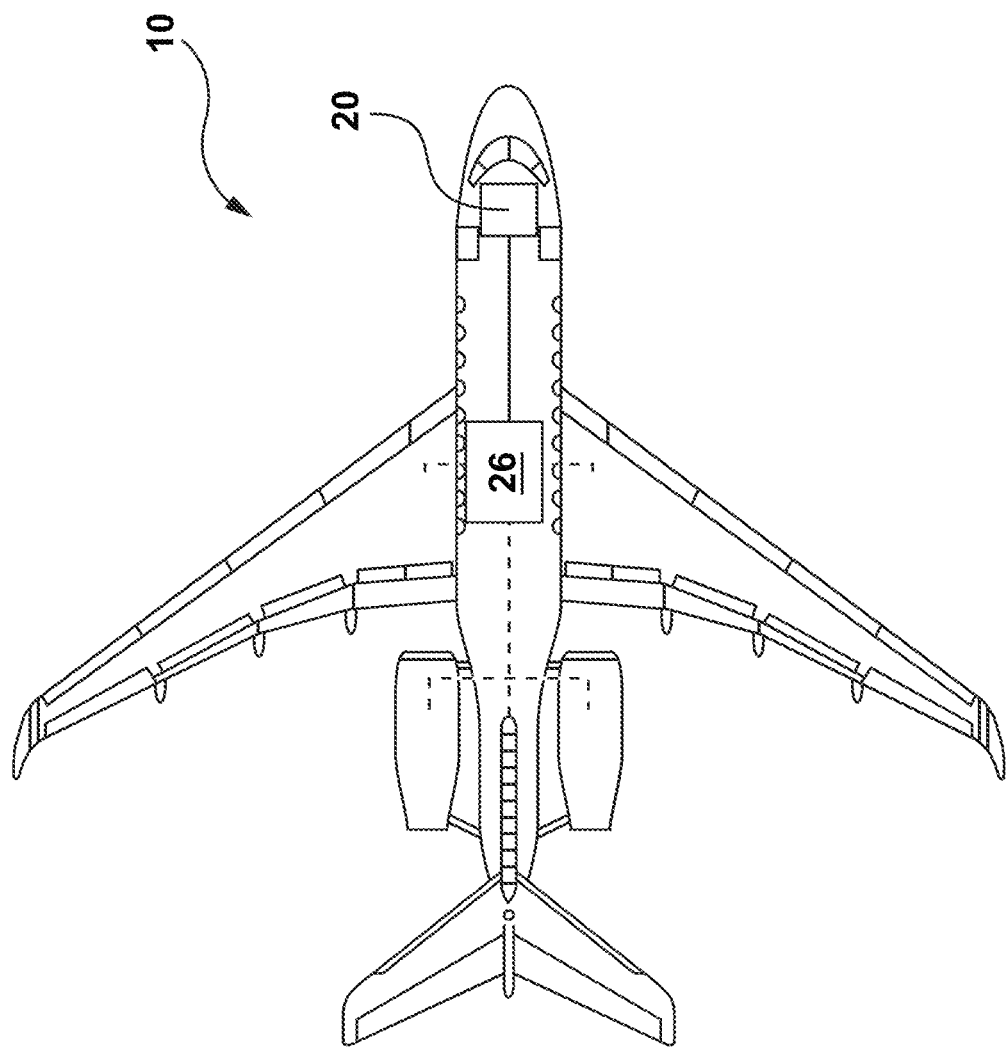
FIG. 1 shows a top plan view of an example aircraft with which various aspects of the present disclosure may be used.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special purpose hardware-based systems that perform the specified functions or acts or by combinations of special purpose hardware and computer instructions.

With these fundamentals in place, we will now consider some non-limiting examples to illustrate various implementations of aspects of the present disclosure.

Aircraft Lighting System Overview

FIG. 1 is a top plan view of an example aircraft 10 with which various aspects of the present disclosure may be used. Aircraft 10 may include, for example, any suitable aircraft such as corporate (i.e. business), private, commercial or any other type of aircraft, including fixed-wing and rotary-wing aircraft, as well as local and remote piloted aircraft. Aircraft 10 may, for example, be a narrow-body, twin engine jet airliner.

Also shown schematically in FIG. 1 is an onboard lighting control system 20 for controlling illumination on board the aircraft 10. The onboard lighting control system 20 may be coupled to various cabin lighting units, referred to collectively as cabin lighting 26, for controlling the activation/deactivation and adjustment of lighting within the aircraft cabin. Onboard lighting control system 20 and cabin lighting 26 are shown in FIG. 1 as being superimposed over aircraft 10 for illustration purposes only.

Figure 2:
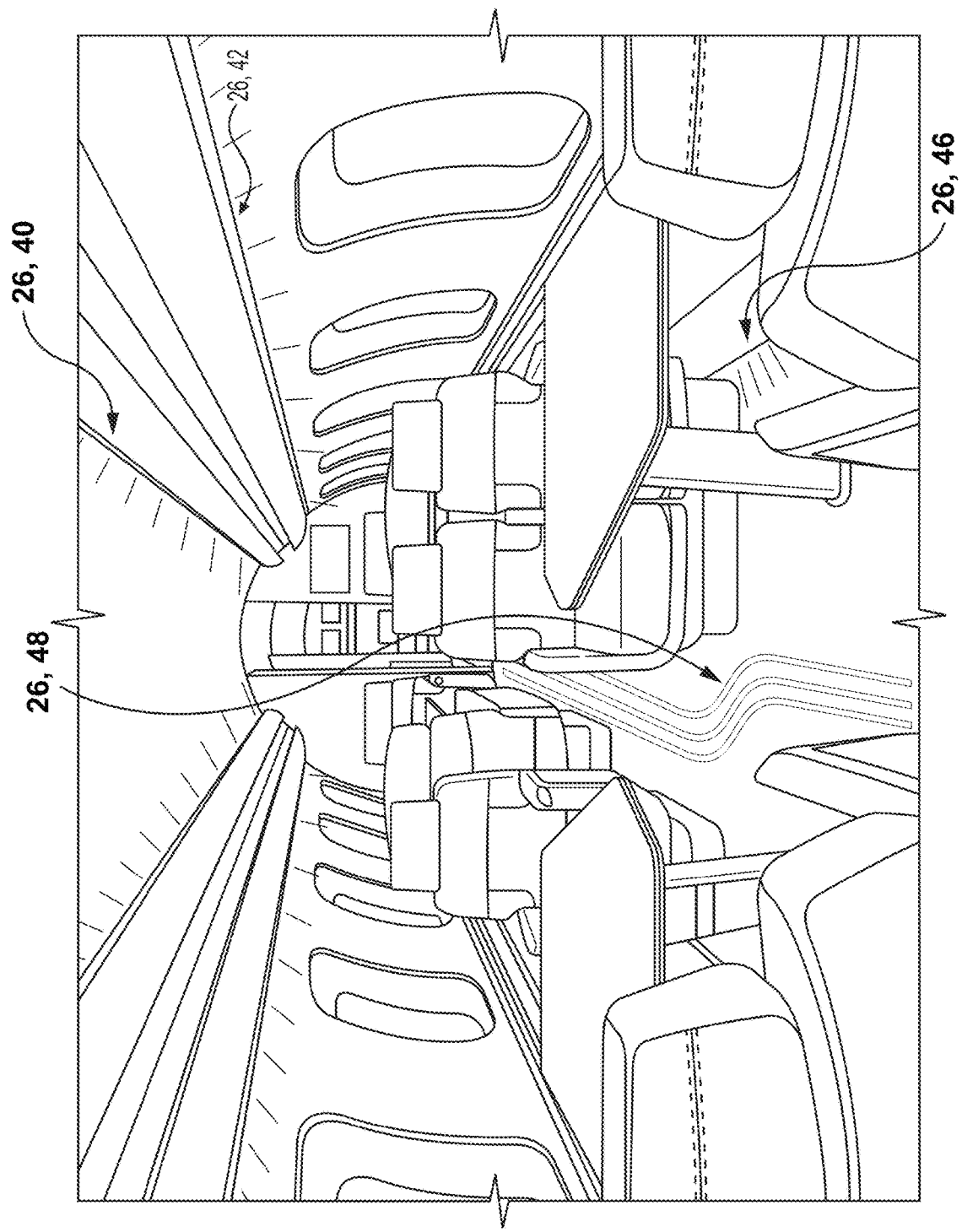
FIGS. 2 and 3 show perspective interior views of different cabin areas within a private aircraft in which the disclosed technology could be used.
Figure 3:
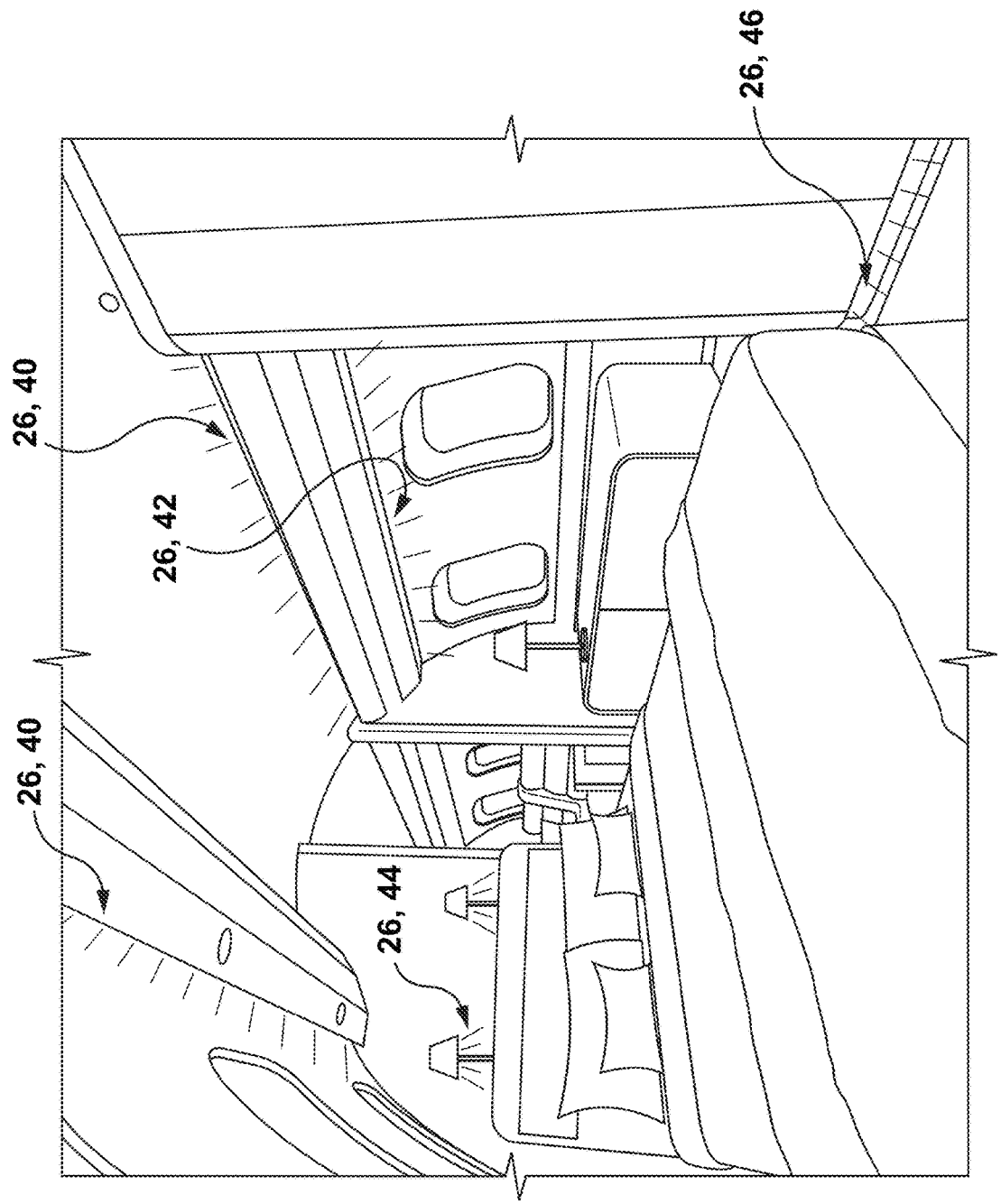

FIGS. 2 and 3 show perspective interior views of different cabin areas within a private aircraft in which the disclosed technology could be used. More specifically, FIGS. 2 and 3 illustrate some non-limiting examples of lighting sources of the cabin lighting 26 that could be used to provide cabin illumination. The different lighting sources include by way of example, overhead lighting 40, wall lighting 42, monument lighting 44, kick-space lighting 46, pathway lighting 48, personal service unit (PSU) lighting (not shown), and lavatory lighting (not shown), among other possibilities. The different lighting sources of the cabin lighting 26 may implemented via many different types of lighting devices, including, without limitation, LED lights, OLED lights, spot lights and fiber-optic lights, among other possibilities. As will be understood, the present disclosure is not intended to be limited by the specific cabin lighting 26 described herein.

Figure 4:
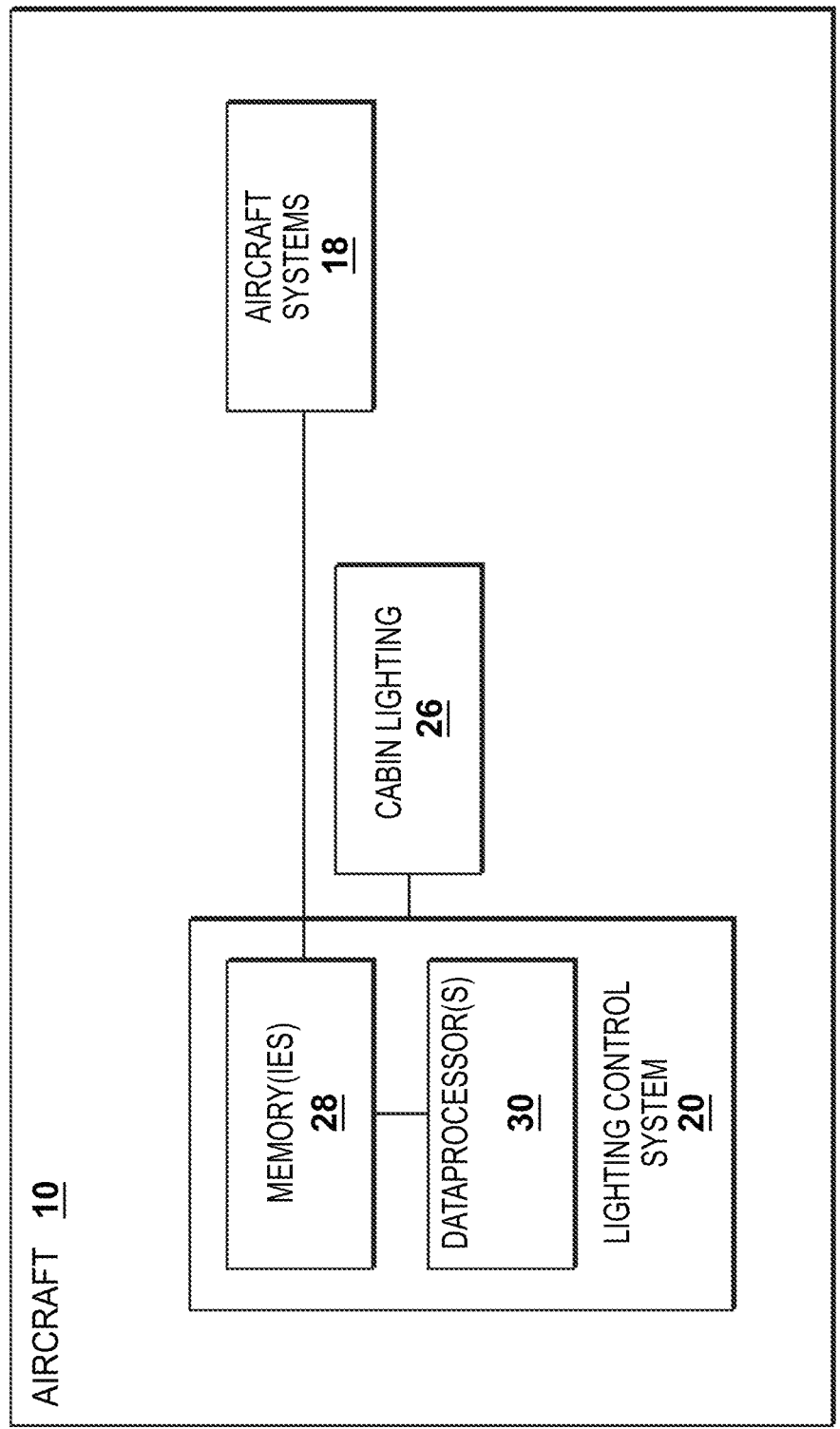
FIG. 4 shows a schematic representation of an aircraft that includes a lighting control system communicatively coupled to cabin lighting, as well as other aircraft systems.

FIG. 4 shows a schematic representation of aircraft 10 that includes lighting control system 20 communicatively coupled to cabin lighting 26, as well as other aircraft systems, collectively referred to as aircraft systems 18. The lighting control system 20 may communicate with one or more aircraft systems 18 to receive information that may be used to detect or determine predetermined cabin conditions. For example, the lighting control system 20 may receive information from aircraft systems 18 indicative of conditions associated with the aircraft, the aircraft cabin or even the external environment in which the aircraft is flying. By way of example, the aircraft systems 18 may include a cabin management system, a flight management system, an avionics system, an in flight entertainment system, an engine system, a landing gear system, and flight control computers, among many other possibilities. The present disclosure is not intended to be limited to the aircraft systems 18 to which the lighting control system 20 may be in communication.

The lighting control system 20 may be operatively connected either directly or indirectly, via wired or wireless connections, to the cabin lighting 26 and the aircraft systems 18. In some implementations, lighting control system 20 may be operatively connected to a network to permit receipt of data, or sharing of data, with the aircraft systems 18 and cabin lighting 26 onboard aircraft 10. Such a network may include one or more data buses, for example.

As shown in FIG. 4, the lighting control system 20 may include one or more data processors 30 (referred hereinafter as "processor 30") and non-transient computer-readable memory(ies)/medium(ia) (referred hereinafter as "memory 28") containing instructions (such as control logic, or one or more applications) readable and executable by processor 30 to implement a computer-implemented process such that instructions, when executed by the data processor 30 can cause the functions/acts described herein. While the lighting control system 20 is shown in FIG. 4 as a stand-alone system, it is understood that it may be embodied as part of a larger cabin management system that includes the cabin lighting 26, and that is responsible for controlling multiple different cabin functions, such as the temperature, audio system and window shades, among other functions. Alternatively, the lighting control system 20 may be an integral part of the cabin lighting 26 wherein the processor 30 and memory 28 are embedded within various lighting sources.

Processor 30 may, for example, include or be part of one or more digital computer(s) or other data processors or other suitably programmed or programmable logic circuits. Processor 30 may include general purpose computer(s), special purpose computer(s), or other programmable data processing apparatus. Processor 30 may be configured for use onboard aircraft 10. Memory 28 may include any combination of one or more suitable computer-readable media.

Daylight Simulation Logic

Figure 5:
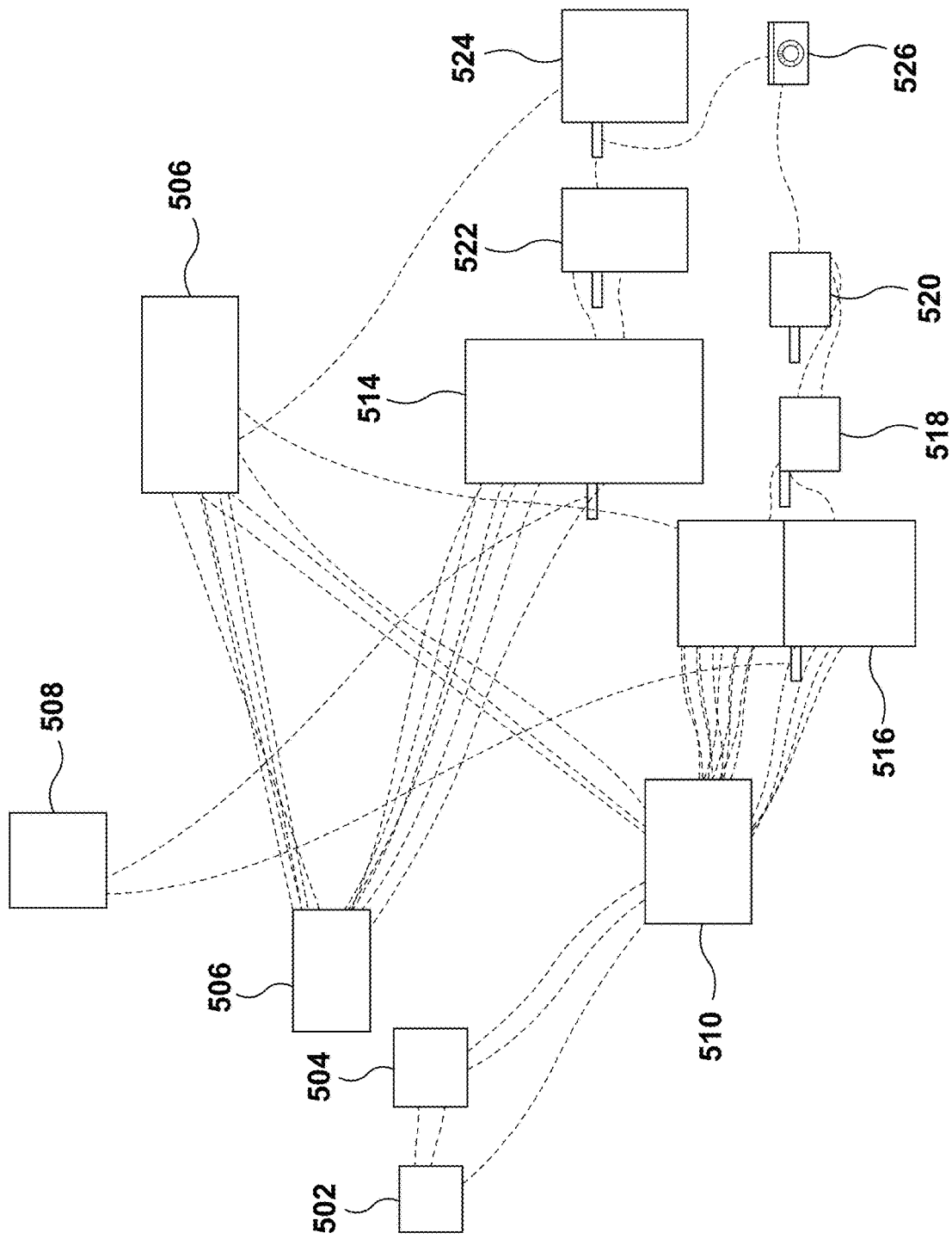
FIG. 5 shows a high-level overview of daylight simulation logic in accordance with the disclosed technology (a multi-page scaled-up version of FIG. 5 (3 pages×3 pages) appears as an Appendix hereto)

FIG. 5 shows a high-level overview of daylight simulation logic in accordance with the disclosed technology, along with the interconnections between the data, tables, and calculations that are used. The daylight simulation logic includes avionics flight management system (FMS) data 502, input flight data 504, database data 506, pre-set database data 508, GUI display data 510, epoch time calculations 512, basic day calculations 514, flight plan calculations 516, flight plan schedular standard day table 518, flight plan schedular simulated standard day table 520, flight schedular standard day table 522, and flight schedular simulated standard day table 524. Additionally, the overview shown in FIG. 5 includes a graphical representation 526 of the standard day simulation. Each of these tables, calculations, and data sources will be described in greater detail below.

In the overview shown in FIG. 5, as well as in the figures detailing the data, tables, and calculations, an example flight between Los Angeles International Airport and Paris Charles de Gaulle Airport is used to illustrate the daylight simulation logic. Additionally, data and calculations may be shown in a hierarchical representation. It will be understood that the calculations performed by the daylight simulation logic, as well as processing of data and tables, may be performed by the lighting control system 20, and may use data from aircraft systems 18.

Figure 6:
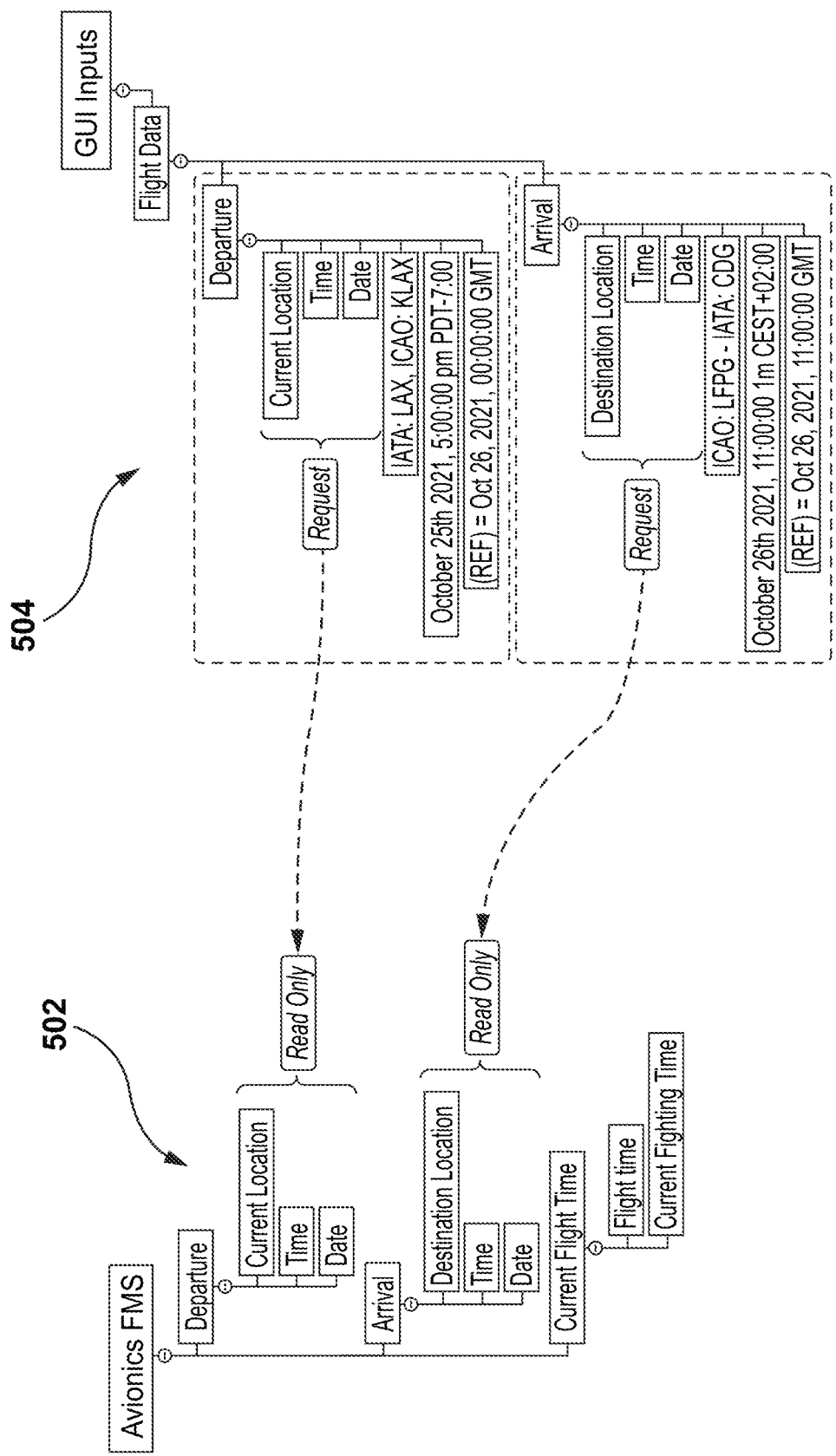
FIG. 6 shows the avionics FMS data and the input flight data portions of the daylight simulation logic.

FIG. 6 shows the avionics FMS data 502 and the input flight data 504. As can be seen, the avionics FMS data includes data from the FMS, such as the current location of the aircraft, the destination location, and the flight time. The data from the avionics FMS are made available to other portions of the daylight simulation logic on a read-only basis.

The input flight data 504 includes data that may be automatically populated from the avionics FMS data 502, such as the current location of the aircraft, the destination location, and so on. The input flight data 504 may further include data that has been input into the system, such as scheduled departure and arrival times, and airport codes.

Figure 7:
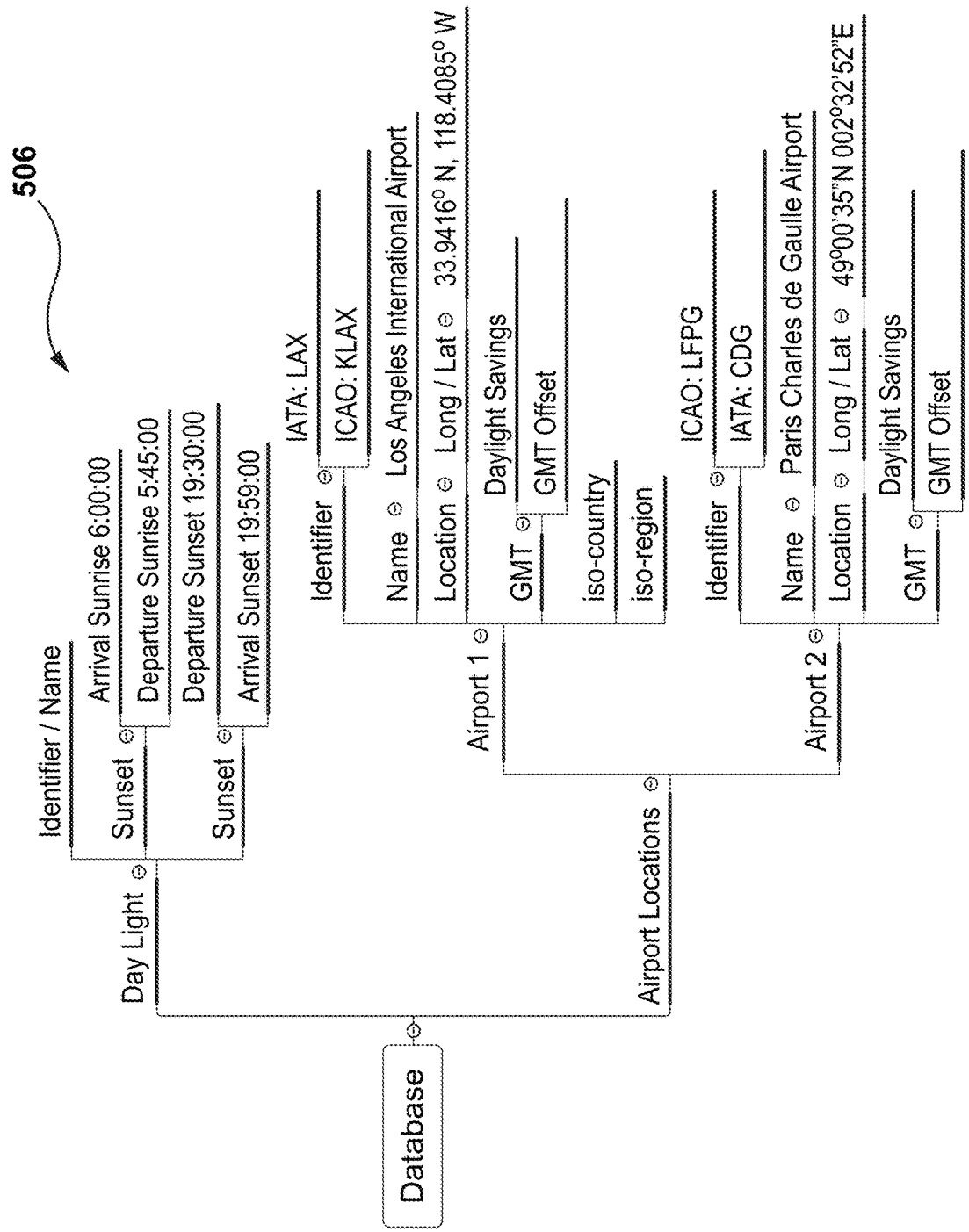
FIG. 7 shows database data of the daylight simulation logic.

FIG. 7 shows database data 506. As can be seen, the database data 506 includes basic data from a database, including information on the arrival and departure airports (e.g., name, location, time zone information, etc.), and information on sunrise and sunset times at the departure and arrival locations.

Figure 8:
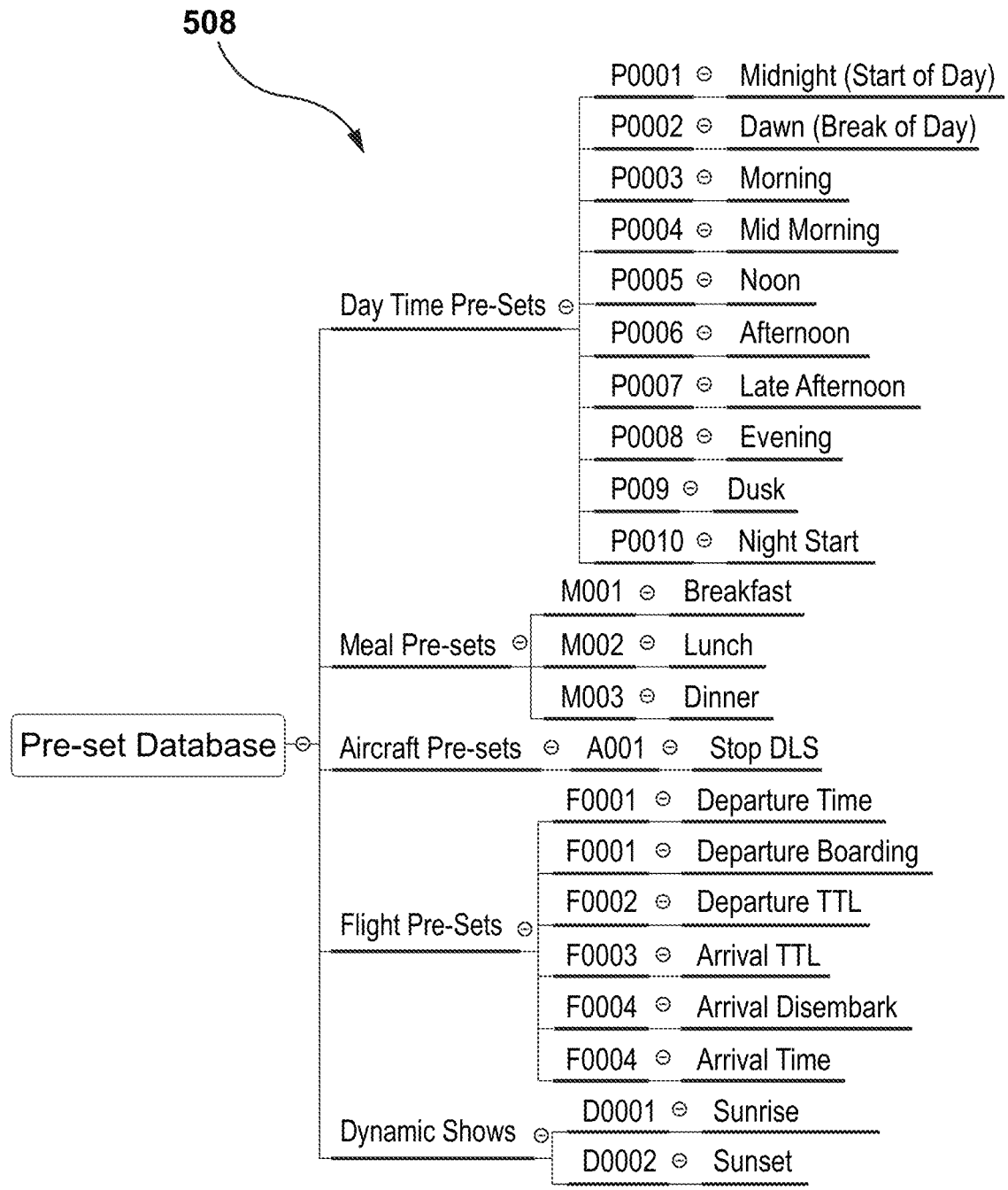
FIG. 8 shows pre-set database data of the daylight simulation logic.

FIG. 8 shows pre-set database data 508. Pre-set database data 508 includes codes for times that are relevant for a flight, such as codes for times of day, codes for meals, and codes for flight-related times, such as departure boarding time, arrival time, etc. These codes are used in other parts of the system to identify times.

Figure 9:
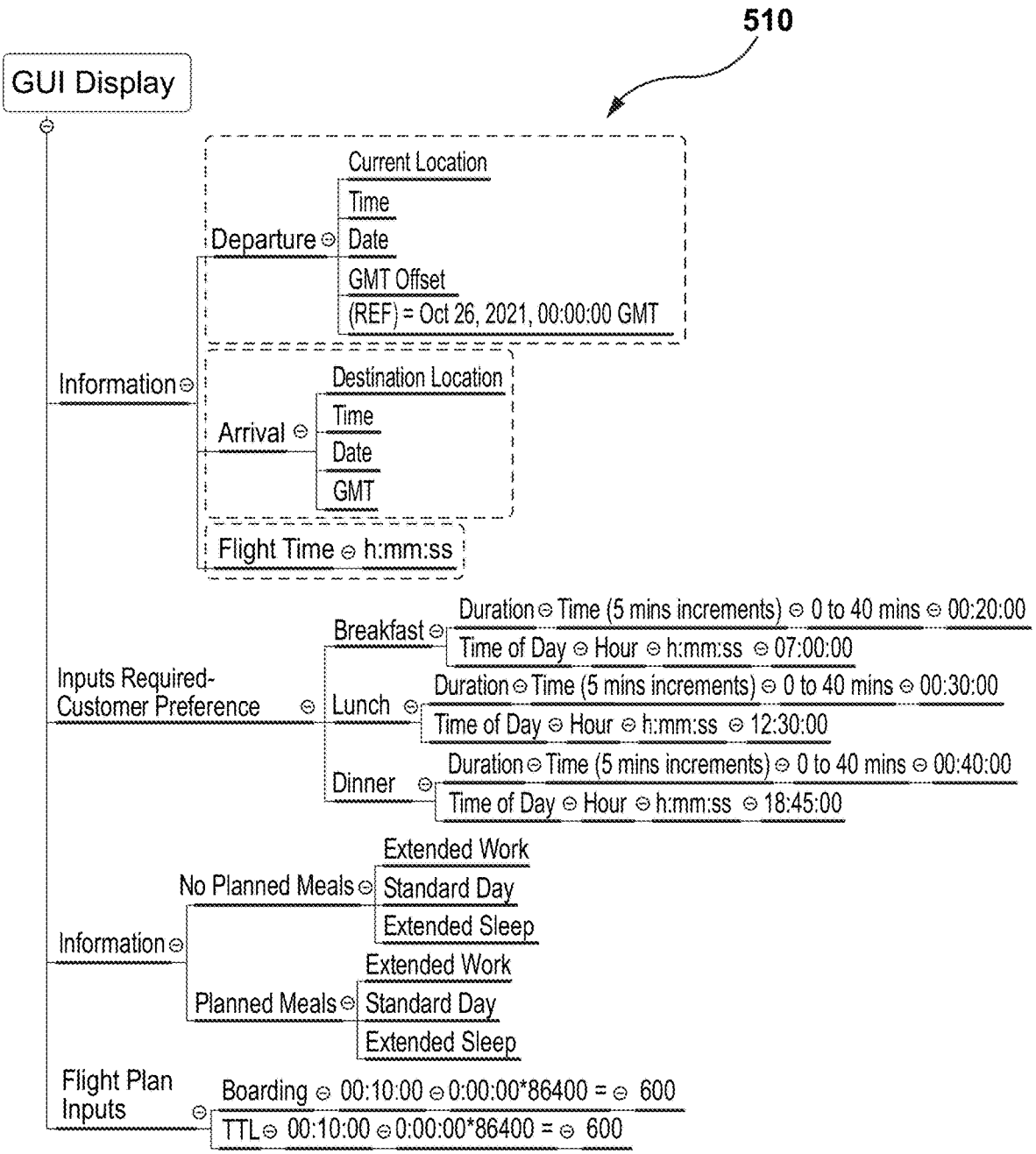
FIG. 9 shows GUI display data of the daylight simulation logic.

FIG. 9 shows GUI display data 510. GUI display data 510 includes data that are displayed on a graphical user interface (GUI), as well as data that is entered into a GUI by a user. Information such as current location, departure information, arrival information, and flight time are only for display, and may be accessed from or linked to the avionics FMS data 502 and/or input flight data 504. Data for input by a user may include inputs such as the time and duration of meals (e.g., in the example shown in FIG. 9, breakfast is scheduled at 07:00 and has a duration of 20 minutes), as well as options such as an "extended work" day (in which, e.g., sleep time and meal times may be shortened) or "extended sleep" (in which, e.g., sleep time may be extended, and meal times may be shortened or eliminated). Inputs may also include information such as boarding time.

Figure 10:
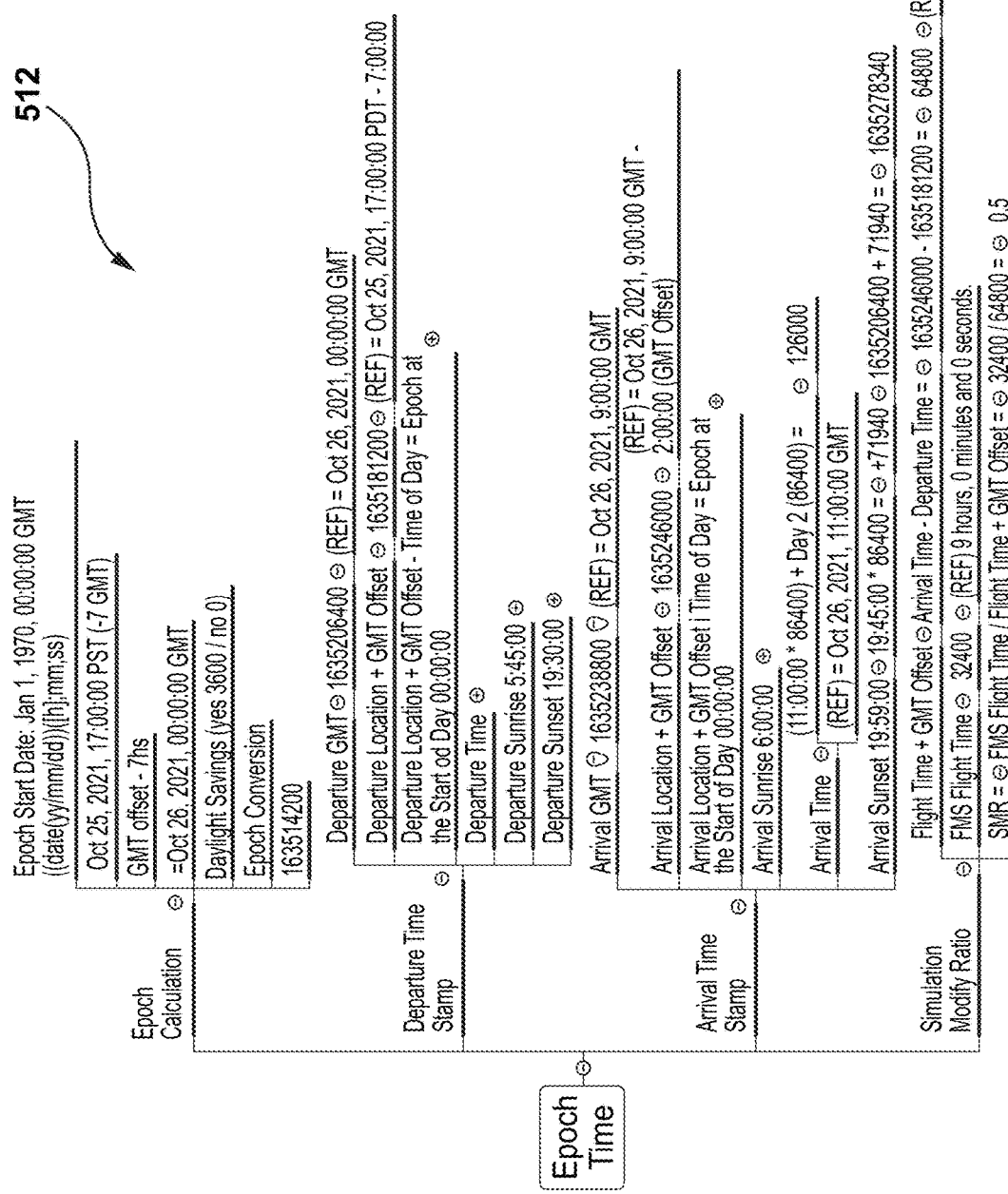
FIG. 10 shows epoch time calculations of the daylight simulation logic.

FIG. 10 shows epoch time calculations 512. Epoch time is the number of seconds (excluding leap seconds) that have elapsed since a particular epoch—typically the "unix epoch," which is Jan. 1, 1970 at 00:00:00. Epoch time calculations 512 perform this calculation, as shown in the "epoch calculation" section. Epoch times are also determined for departure time and arrival time. Use of epoch time makes it easier to calculate, e.g., intervals in seconds between two times. Some of the data used in the epoch time calculations—e.g., for the departure time stamp, the arrival time stamp, and whether daylight savings time applies, may be linked with data from the database data 506.

The epoch time calculations 512 also include a calculation of a "simulation modify ratio" or SMR, which is used to scale periods of the day according to the flight time and time zone changes. As can be seen in FIG. 10, the SMR is calculated by dividing the FMS flight time (i.e., the expected actual time in flight, per the FMS) by the flight time including GMT offsets for arrival and departure. This flight time with GMT offset is calculated (again, as seen in FIG. 10) by subtracting the departure time including GMT offset at the departure location from the arrival time including GMT offset at the arrival location. In the example shown in FIG. 10, the arrival time including GMT offset at the arrival location is (in epoch time) 1635246000, and the departure time including GMT offset at the departure location is (in epoch time) 1635181200, for a difference of 64800 seconds (i.e., 18 hours). The FMS flight time is 9 hours, which is 32400 seconds. Therefore, the SMR is 32400/64800=0.5. Essentially, in this example, a difference in local times of 18 hours between arrival and departure needs to be scaled to the actual flight time of 9 hours for controlling lighting, meal times, etc. An SMR of 0.5 means that periods of the day that occur during the flight will be half as long as their "normal" durations for purposes of controlling the cabin lighting.

FIGS. 11A and 11B show basic day calculations 514. The basic day calculations 514 determine the start and run times for various parts of the day, such as midnight, sunrise, dawn, morning, mid-morning, noon, afternoon, late afternoon, evening, dusk, sunset, night start, and night (end of day). Some of these values are fixed, while others are calculated, as specified in the "type" information for each period. Additionally, the "type" information may be used to specify pre-set lighting displays, such as dynamic lighting changes at sunrise and sunset. Information on the periods of the day and their codes may be linked to the pre-set database data 508. Information on, e.g., the times of sunrise and sunset may be linked to the database data 506. In accordance with various implementations of the disclosed technology, if there is no sunrise/sunset time, as will be the case, e.g. in polar regions during summer (no sunset) and winter (no sunrise), the duration of the offset between a start of day/sunrise and sunset/end of day is set to 0, to better respect actual lighting conditions at those times.

FIGS. 12A and 12B show flight plan calculations 516. The flight plan calculations 516 determine start and run times for meals and for flight events, such as departure, boarding, arrival, etc. Entries in the flight plan calculations may be fixed or programmed, as determined by the "type" information for each entry. The entries are also linked to codes for the meals and flight events from the pre-set database data 508, to user inputs on, e.g., meal times, meal durations, and boarding, from the GUI display data 510, and to information on, e.g., departure time and arrival time, from the epoch time calculations 512.

Figure 13:
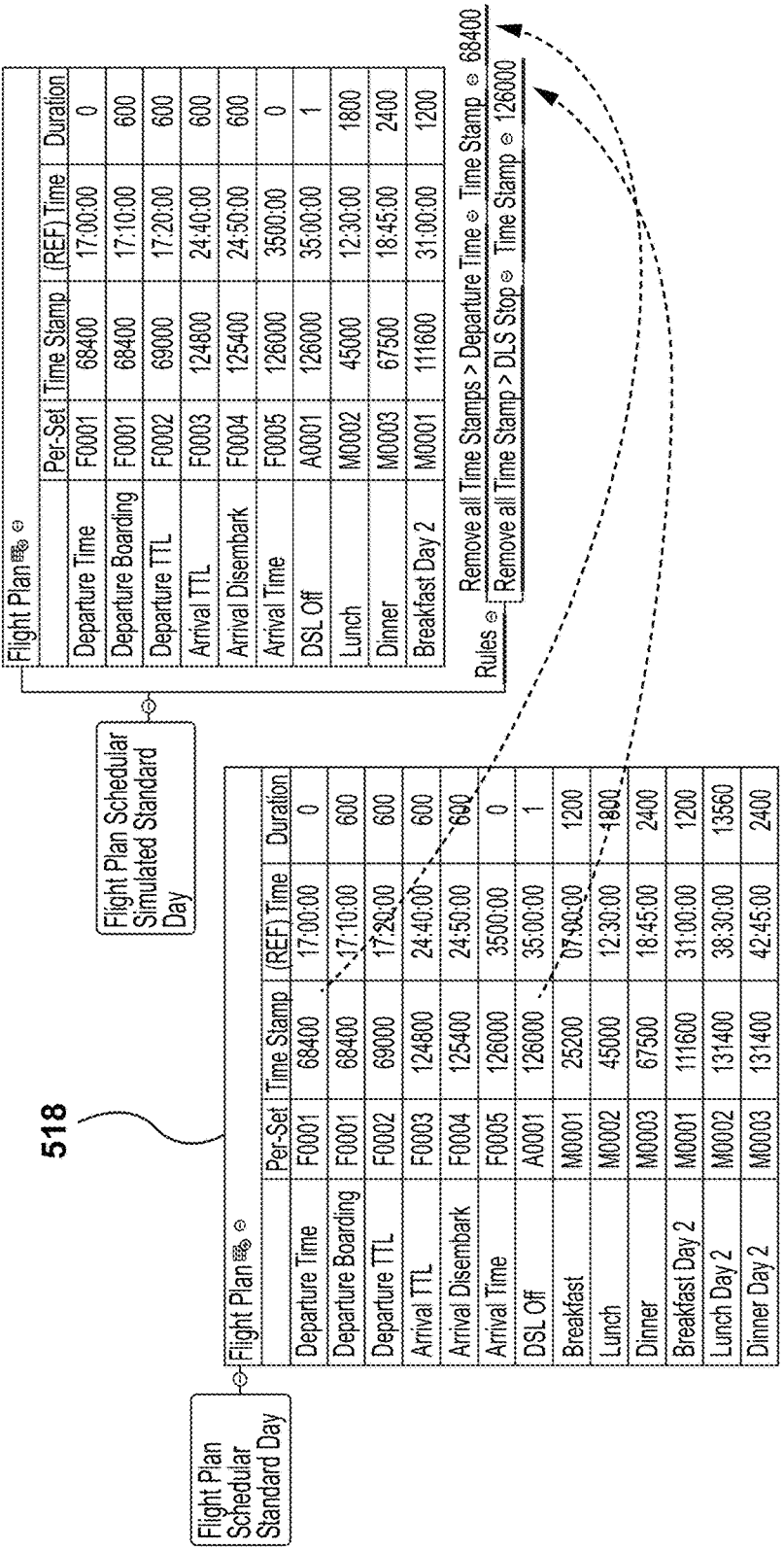
FIG. 13 shows a flight plan schedular standard day table and a flight plan schedular simulated standard day table of the daylight simulation logic.

FIG. 13 show flight plan schedular standard day table 518, which includes the pre-set code, time stamp, time, and duration for the events scheduled in the flight plan calculations 516. The flight plan schedular simulated standard day table 520 is also shown. As specified in the rules for the flight plan schedular simulated standard day table 520, time stamps before the departure time and time stamps after the DLS stop event are removed from the flight plan schedular standard day table 518 to generate the flight plan schedular simulated standard day table 520.

FIG. 14 shows the flight schedular standard day table 522, which includes the pre-set code, time stamp, time, and duration for each period of the day, as determined in the basic day calculations 514. These periods of the day are used to control the cabin lighting, but their durations have not yet been scaled using the simulation modify ratio (SMR), which may also be referred to as the simulation ratio modifier (SRM).

The scaled periods of the day are shown in the flight schedular simulated standard day table 524, as shown in FIG. 15. The flight schedular simulated standard day table 524 includes the pre-set code, time stamp, time, and duration for each period of the day, as in the flight schedular standard day table 522. Additionally, the flight schedular simulated standard day table 524 is linked to the SMR (or SRM) from the epoch time calculations 512. Per the rules that apply to the flight schedular simulated standard day table 524, the SMR (or SRM) is applied to the durations for all time stamps that are greater than the departure time and less than the DLS stop event. The application of the SMR (or SRM) is shown in the "SRM" column of the table, and the scaled duration is shown in the "Label 6" column.

The scaled durations are used to control the lighting program for the aircraft interior while the aircraft is in flight. As discussed above, if there is no sunrise/sunset time (e.g., in polar regions), the duration of the offset between a start of day/sunrise and sunset/end of day may be set to 0.

Figure 16:
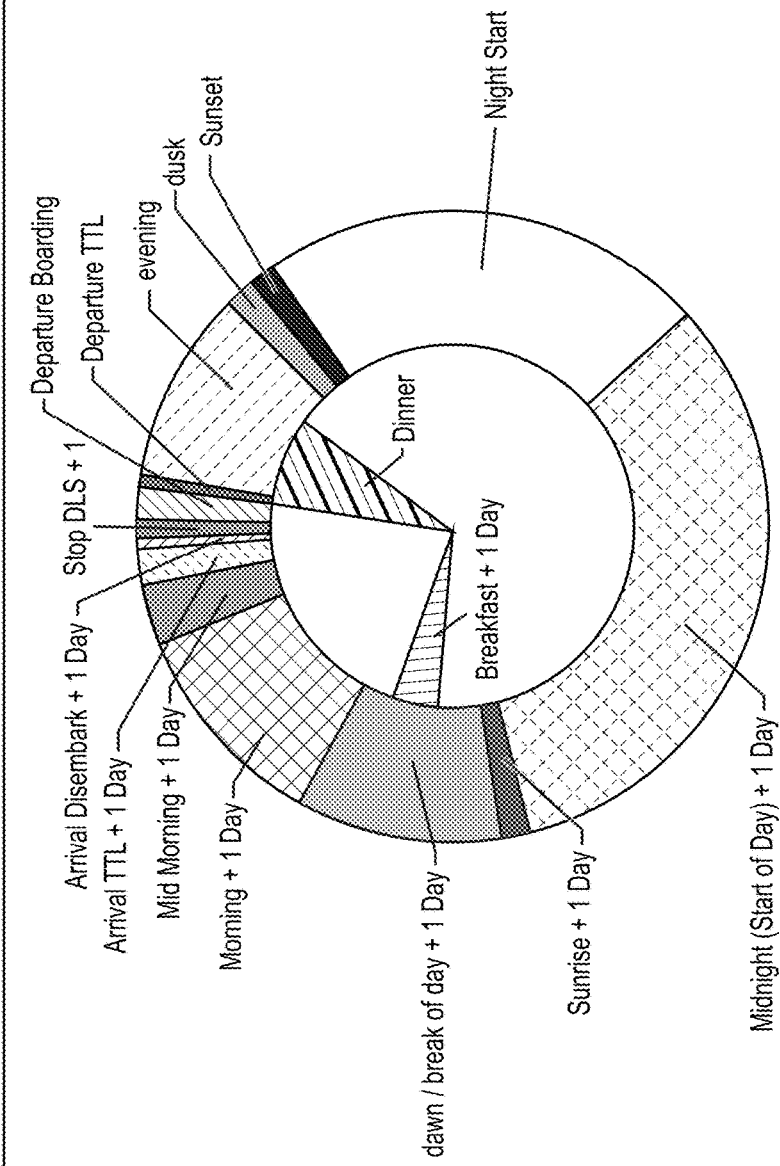
FIG. 16 shows a graphical representation of a standard day simulation in accordance with the disclosed technology.

FIG. 16 shows a graphical representation 526 of the standard day simulation. The graphical representation 526 is based on information from the flight plan schedular simulated standard day table 520 and the flight schedular simulated standard day table 524.

It will also be understood that, although the implementations presented herein have been described with reference to specific features and structures, various modifications and combinations may be made without departing from such disclosures. The specification and drawings are, accordingly, to be regarded simply as an illustration of the discussed implementations or implementations and their principles as defined by the appended claims, and are contemplated to cover any and all modifications, variations, combinations or equivalents that fall within the scope of the present disclosure.

What is claimed is:

1. A method for use on a lighting control system that is communicatively coupled to cabin lighting on an aircraft to control lighting in an interior of the aircraft according to a lighting program, the method comprising:
    determining a departure time and an arrival time as epoch times, the departure time being adjusted for an offset from GMT at a departure location and the arrival time being adjusted for an offset from GMT at an arrival location;
    generating a flight time with GMT offsets based, at least in part, on subtracting the departure time from the arrival time;
    determining an FMS flight time that represents an expected time that the aircraft will be in flight between the departure location and the arrival location;
    generating a simulation ratio modifier based, at least in part, on dividing the FMS flight time by the flight time with GMT offsets;
    applying the simulation ratio modifier to periods of a day between departure and arrival to generate scaled durations for periods of the day in a lighting program; and
    applying the lighting program to control the cabin lighting on the aircraft during flight according to the scaled durations.

2. The method of claim 1, wherein the periods of the day between departure and arrival include a sunrise and/or a sunset.

3. The method of claim 2, wherein, if there is no sunrise time and/or no sunset time, a duration of an offset between a start of day/sunrise and a sunset/end of day is set to zero.

4. A lighting control system communicatively coupled to cabin lighting on an aircraft to control lighting in an interior of the aircraft according to a lighting program, the system comprising:
    one or more data processors operatively coupled to the cabin lighting; and
    a non-transitory machine-readable memory operatively coupled to the one or more data processors, storing instructions executable by the one or more data processors and configured to cause the one or more data processors to:
    determine a departure time and an arrival time as epoch times, the departure time being adjusted for an offset from GMT at a departure location and the arrival time being adjusted for an offset from GMT at an arrival location;
    generate a flight time with GMT offsets based, at least in part, on subtracting the departure time from the arrival time;
    determine an FMS flight time that represents an expected time that the aircraft will be in flight between the departure location and the arrival location;
    generate a simulation ratio modifier based, at least in part, on dividing the FMS flight time by the flight time with GMT offsets;
    apply the simulation ratio modifier to periods of a day between departure and arrival to generate scaled durations for periods of the day in a lighting program; and
    apply the lighting program to control the cabin lighting on the aircraft during flight according to the scaled durations.

5. The system of claim 4, wherein the periods of the day between departure and arrival include a sunrise and/or a sunset.

6. The system of claim 5, wherein, if there is no sunrise time and/or no sunset time, a duration of an offset between a start of day/sunrise and a sunset/end of day is set to zero.

7. A computer program product for use on a lighting control system that is communicatively coupled to cabin lighting on an aircraft to control lighting in an interior of the aircraft according to a lighting program, the computer program product comprising a non-transitory computer readable storage medium containing program code, the program code readable/executable by a computer, processor or logic circuit to perform a method comprising:
- determining a departure time and an arrival time as epoch times, the departure time being adjusted for an offset from GMT at a departure location and the arrival time being adjusted for an offset from GMT at an arrival location;
- generating a flight time with GMT offsets based, at least in part, on subtracting the departure time from the arrival time;
- determining an FMS flight time that represents an expected time that the aircraft will be in flight between the departure location and the arrival location;
- generating a simulation ratio modifier based, at least in part, on dividing the FMS flight time by the flight time with GMT offsets;
- applying the simulation ratio modifier to periods of a day between departure and arrival to generate scaled durations for periods of the day in a lighting program; and
- applying the lighting program to control the cabin lighting on the aircraft during flight according to the scaled durations.

8. The computer program product of claim 7, wherein the periods of the day between departure and arrival include a sunrise and/or a sunset.

9. The computer program product of claim 8, wherein, if there is no sunrise time and/or no sunset time, a duration of an offset between a start of day/sunrise and a sunset/end of day is set to zero.

* * * * *